(12) United States Patent
O'Reilly et al.

(10) Patent No.: US 7,965,801 B1
(45) Date of Patent: Jun. 21, 2011

(54) DIGITAL DATA RECOVERY

(75) Inventors: Adrian W. O'Reilly, Mountmellick (IE); Noel J. Brady, Dublin (IE)

(73) Assignee: XILINX, Inc., San Jose, CA (US)

( * ) Notice: Subject to any disclaimer, the term of this patent is extended or adjusted under 35 U.S.C. 154(b) by 630 days.

(21) Appl. No.: 12/117,149

(22) Filed: May 8, 2008

(51) Int. Cl.
  *H04L 7/00* (2006.01)
  *H04L 27/06* (2006.01)
(52) U.S. Cl. ........................ 375/355; 375/340
(58) Field of Classification Search .................. 375/219, 375/326, 340, 355, 371, 359, 360; 327/23–27, 327/31, 33, 50, 77–70, 141
  See application file for complete search history.

(56) References Cited

U.S. PATENT DOCUMENTS 7,672,416 B2 * 3/2010 Hadzic et al. ................. 375/360

OTHER PUBLICATIONS

Xilinx, Inc., "A 3/4/5/6X Oversampling Circuit for 200 Mb/s to 1000 Mb/s Serial Interfaces," Nov. 18, 2004, pp. 1-13, XAPP572 (v.1.0), available from Xilinx, inc., 2100 Logic Drive, San Jose, California 95124, USA.

* cited by examiner

*Primary Examiner* — Tesfaldet Bocure
(74) *Attorney, Agent, or Firm* — W. Eric Webostad; Thomas George

(57) ABSTRACT

Data recovery, as well as associated circuitry and system, is described. An input word stream having a word width of at least one word is obtained and a sliding window is applied to it to resolve phases. Scores for phases are determined at least in part by: subdividing the sliding window into sample portions; applying a homogeneity function to each of the sample portions to determine respective values therefor; and summing sets of the values respectively associated with the phases to provide the scores. A score is selected from the scores according to at least one criterion to select a phase from the phases. A portion of a delayed version of the input word stream is sampled by application of the sliding window thereto using the phase selected to output sampled bits.

20 Claims, 7 Drawing Sheets

DIGITAL DATA RECOVERY

FIELD OF THE INVENTION

The invention relates to integrated circuit devices (ICs). More particularly, the invention relates to digital data recovery for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Some high-speed interfaces, such as high-speed communication interfaces for example, are serial interfaces, and some high-speed communication serial interfaces are source synchronous or system synchronous. In source synchronous communication, a transmitter sends a clock signal separate from the data, and a receiver uses this forwarded clock for data reception. In system synchronous communication, a common clock is used by both transmitter and receiver.

However, more recently, high-speed communication serial interfaces are self-synchronous. In self-synchronous communication, a transmitter generates a serial stream of information including both data and clock information. For example, data and clock information may be transmitted together on a single wire, or on a pair of wires using differential signaling. A receiver having a clock data recovery ("CDR") circuit recovers and separates the data and clock information embedded in the transmitted serial data stream.

Some CDR circuits use a phased-locked loop ("PLL"). Conventionally, such a PLL is implemented to lock to an incoming serial data stream transmitted by a transmitter using a reference clock signal allowing recovery of a clock signal. The recovered clock signal may have a frequency that at least substantially, if not exactly, matches that of the clock signal used by the transmitter to generate the transmitted serial data stream.

Conventionally, a CDR circuit outputs a fixed-width parallel data bus and the recovered clock signal. The CDR circuit may include a serial-to-parallel converter for deserializing the data of the serial data stream received. The recovered clock signal may thus be a factor slower in frequency than the clock signal used by the transmitter to generate the serial data stream transmitted, and this factor may be dependent upon the bit width of the parallel data bus.

Some PLL-based CDR circuits are designed for a frequency range. The bottom of this frequency range for example may be approximately one Giga-bits-per-second ("Gbps"). If a lower frequency than the bottom of a frequency range of a PLL-based CDR is to be used, then conventionally a digital data recovery circuit is coupled on an output side of the PLL-based CDR.

In brief, if the PLL-based CDR is designed to operate at a faster rate than the incoming serial data stream, the incoming serial data stream is oversampled by the PLL-based CDR. A digital data recovery circuit is used to extract "real data bits" from the oversampled bits output on the parallel data bus of the PLL-based CDR. So, for example, if the clock signal used by the transmitter to generate the serial data stream transmitted was 125 Mega-bps ("Mbps") and the PLL-based CDR was designed to operate at a bottom frequency of one Gbps, then output of the PLL-based CDR would be oversampled by an oversampling factor of eight, namely a real bit would generally be represented by eight oversampled bits.

Generally, digital oversampling involves detecting the location of data transitions and sampling at the midpoint between these transitions. Unfortunately, if a communication channel is too noisy or if a transmission is too attenuated, or a combination thereof, resolving real bits from oversampled bits may be problematic, and conventional transition detection may not be sufficient. Noise or attenuation may introduce "glitches" in an oversampled input stream, where such glitches are detected as real edges or data transitions. Thus, the sampling point in an oversampled input stream may be off. Furthermore, bits may be output as "real" bits even though they are not because erroneous bits caused by glitches are detected as being real bits.

A low-pass filter may be added to a receiver to remove glitches from a received stream; however, such filtering is generally insufficient for the more noisy communication channels. Another alternative is to add a PLL-based CDR designed to a lower frequency range to match that of the transmitter; however, this may add complexity in the form of additional components, as the lower frequency range may be too slow to accommodate higher transmission rates.

SUMMARY OF THE INVENTION

One or more aspects generally relate to integrated circuit devices (ICs) and, more particularly, to digital data recovery for an IC.

An aspect generally relates to a data recovery circuit. An accumulator is coupled to receive oversampled data. The accumulator is configured to determine and to accumulate sub-scores from the oversampled data using a sliding window. A bit width of the sliding window is associated with data width of the oversampled data input to the accumulator. The sliding window is sequentially and incrementally shifted to bitwise resolve phases from the oversampled data. The phases in number are associated with an oversampling factor. The accumulator is further configured to sum for each of the phases the sub-scores to provide scores for each of the phases. A detector-tracker circuit is coupled to receive the scores. The detector-tracker circuit is configured to select a phase of the phases responsive at least to the scores and output the phase selected. The detector-tracker circuit is further configured to track the phase selected. A delay circuit is coupled to receive the oversampled data and configured to output a delayed version of the oversampled data. A sampler is coupled to receive the delayed version of the oversampled data and the phase selected. The sampler is configured to sample the oversampled data responsive to the phase selected to provide sampled data for output as a subset of the oversampled data.

Another aspect generally relates to a method for data recovery. An input word stream is obtained having a word width of at least one word. A sliding window is applied to the input word stream to resolve phases. Scores for the phases are determined. The scores are generated at least in part by subdividing the sliding window into sample portions; applying a homogeneity function to each of the sample portions to determine respective values therefor; and summing sets of the values respectively associated with the phases to provide the scores. A score is selected from the scores according to at least one criterion to select a phase from the phases. A portion of a delayed version of the input word stream is sampled by application of a sampling window using the phase selected to output sampled bits.

Yet another aspect generally relates to a system-on-chip integrated circuit. A transceiver has a sampling circuit configured to operate above a first bit rate. A serial-to-parallel converter is coupled to the sampling circuit to receive a serial bitstream therefrom and to convert the serial bitstream into a parallel bitstream. The serial bitstream is capable of being associated with a second bit rate lower than the first bit rate. A data recovery circuit is coupled to receive the parallel bitstream, which is capable of representing oversampled data responsive to the serial bitstream being at the second bit rate. The data recovery circuit includes an accumulator coupled to receive the oversampled data and configured to determine and to accumulate sub-scores from the oversampled data using a sliding window. A bit width of the sliding window is associated with data width of the oversampled data input to the accumulator. The sliding window is sequentially and incrementally shifted to bitwise resolve phases from the oversampled data. The phases in number are associated with an oversampling factor. The accumulator is further configured to sum the sub-scores for each of the phases to provide scores for each of the phases. A detector-tracker circuit is coupled to receive the scores. The detector-tracker circuit is configured to select a phase of the phases at least responsive to the scores and output the phase selected and is further configured to track the phase selected. A delay circuit is coupled to receive the oversampled data and configured to output a delayed version of the oversampled data. A sampler is coupled to receive the delayed version of the oversampled data and the phase selected. The sampler is configured to sample the oversampled data responsive to the phase selected to provide sampled data for output as a subset of the oversampled data.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

In the following description, digital data recovery is described which may be used to cope with glitches introduced into a received data stream. Such glitches may be due to noise or transmission attenuation, or a combination thereof. Furthermore, it shall be appreciated that such digital data recovery may be used in excessively noisy communication environments. As shall be appreciated from the following description, digital data recovery circuitry as described herein may be readily coupled on an output side of a PLL-based CDR. Though the example of coupling digital data recovery circuitry to a transceiver of an FPGA, such as a Gigabit transceiver of an FPGA from Xilinx, Inc. of San Jose, Calif., is used, it should be understood that digital data recovery as described herein may be used in any of a variety of integrated circuits with receivers. Furthermore, such digital data recovery may be integrated on-chip with such receivers for providing a single IC chip solution, as the amount of resources used for digital data recovery circuitry described herein is relatively small.

Furthermore, there are a couple of terms used in the following description for which a general definition is provided for purposes of clarity. The term "sliding window" as used herein generally means a bit area or space of an oversampled input stream. As used herein, a sliding window is used to resolve phases at an instant in time. The term a "sampling window" as used herein generally means a portion of the oversampled input stream within the bit area or space defined by application of the "sliding window" used to capture a real-bit. Lastly, a "voting window" as used herein generally means the set of bits or a subset of bits as defined by application of the sampling window to ascribe a value to the real-bit.

Figure 1:
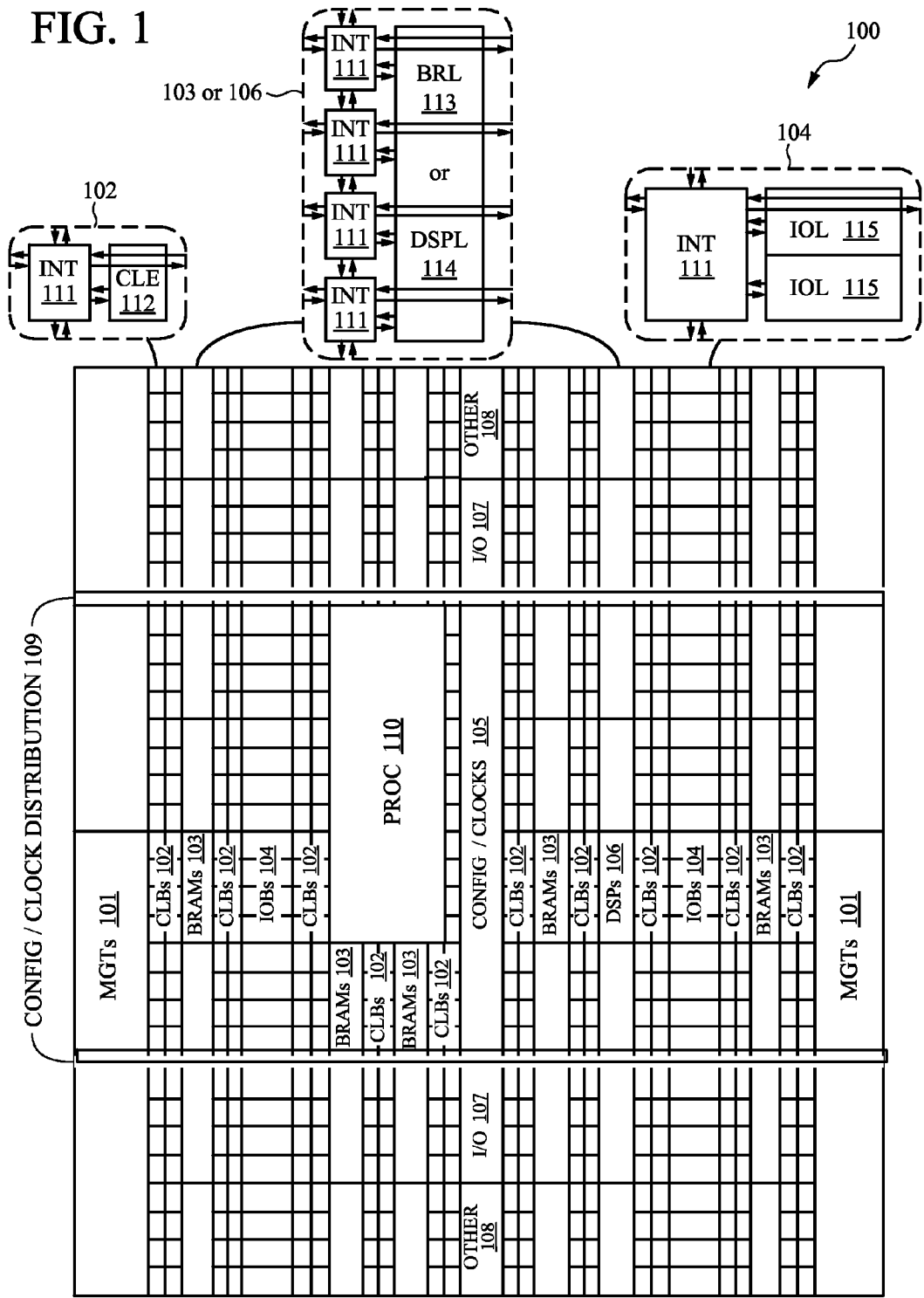
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
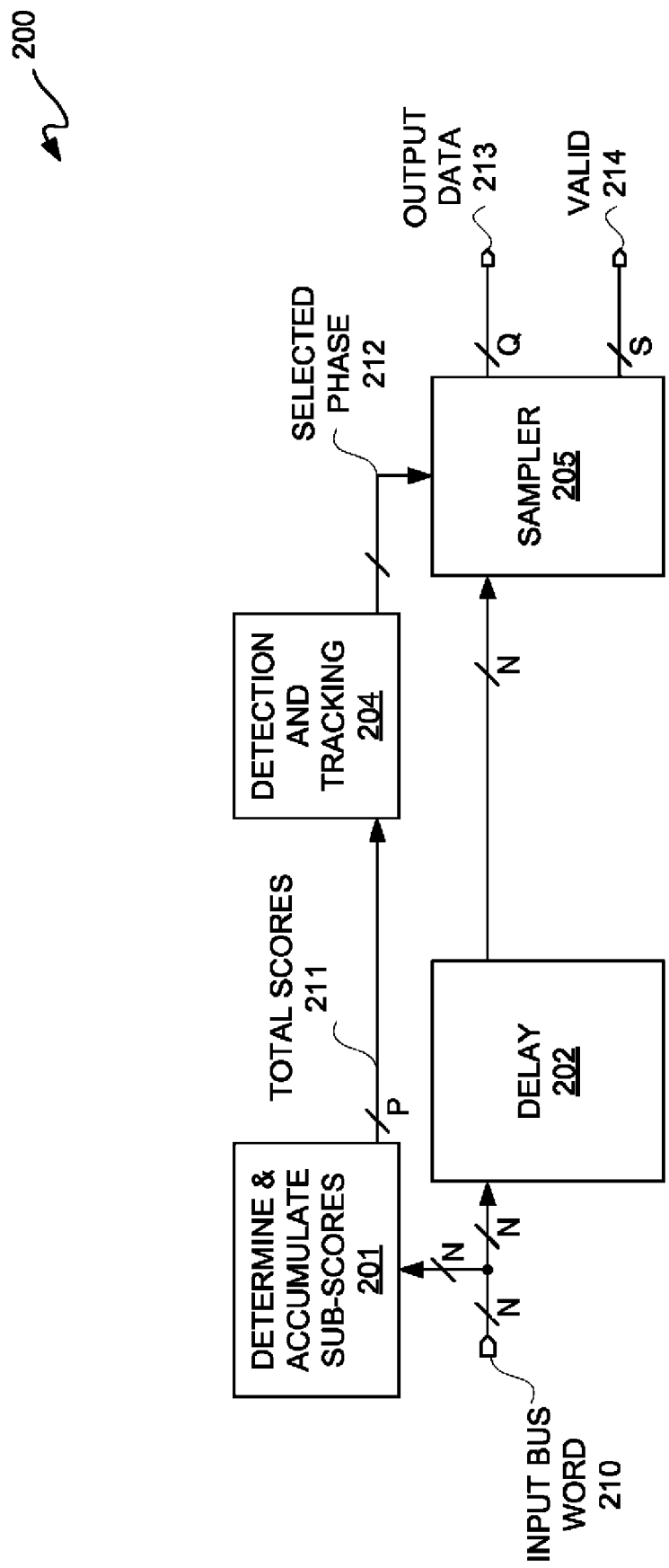
FIG. 2 is a block diagram depicting an exemplary embodiment of a digital data recovery circuit.

FIG. 2 is a block diagram depicting an exemplary embodiment of a digital data recovery circuit 200. Digital data recovery circuit 200 includes determine and accumulate sub-scores block 201, detection and tracking block 204, delay block 202, and sampler 205.

As previously described, a receiver may receive a transmission. This transmission may be a serial transmission including both data and clock information as in a self-synchronous transmission. While the following description is in terms of digital data recovery which may be used for any of a variety of known types of data recovery applications, it shall be assumed that a serial transmission in a self-synchronous system is used for purposes of clarity by way of example and not limitation. Along those lines, it should be appreciated that a transceiver, such as a multi-Giga-bit transceiver (MGT) 101 of FPGA 100 of FIG. 1 may be used to receive such a serial transmission. Although the example of an FPGA-implemented digital data recovery circuit 200 is described, it should be appreciated that digital data recovery circuit 200 may be implemented in any of a variety of ICs having a receiver.

It should be understood that a serial transmission may be converted into a parallel data bus. A serial-to-parallel converter may be used for this conversion. Programmable logic of FPGA 100 may be used to implement a serializer/deserializer ("SERDES"). Thus, information received by a receiver from a serial stream transmitted may be converted into parallel groupings of data. For purposes of clarity and not limitation, it shall be assumed that input data 210 is such a parallel bus word sourced from output of a serial-to-parallel conversion. Input bus word 210 has a bit width of N, for N a positive integer indicating a bit width. The parallel oversampling clock, that is sufficiently synchronous to and sufficiently at the same rate as the parallel oversampled data is separated out and thus input bus word 210 does not include clock information.

Input bus word 210 is provided to delay block 202 and to determine and accumulate sub-scores block 201. Delay block 202 may include a plurality of shift registers. For example, for bit width N equal to 20, there may be 20 separate shift registers in parallel for implementing delay block 202. The length of each of these shift registers would cover the clock stages to account for the processing delay by blocks 201 and 204 as well as phase shifts. Notably, a clock signal is not illustratively shown in FIG. 2 for purposes of clarity and not limitation, but it should be understood that clock signaling is used as part of digital data recovery circuit 200. Furthermore, although the example of an input bus word 210 of a 20-bit width is used for purposes of clarity, it should be appreciated that any of a variety of known bit widths may be used.

Input bus word 210 may include oversampled data from a PLL-based CDR, separated from a parallel oversampling clock signal also provided from such PLL-based CDR. Thus, it should be appreciated that input bus word 210 is data of a fixed bit width ("bus") which is synchronous with a parallel oversampling clock. Detection and tracking block 204 may be used to detect and track where real bits begin and end in an oversampled data stream.

Determine and accumulate sub-scores block 201 includes a plurality of sub-score blocks, which are described below in additional detail with reference to FIG. 4. There may be a sub-score block for each portion or phase associated with the oversampling rate. The term "phase" may generally be considered to identify a starting point in an oversampled input stream where a real bit starts. As shall be gleaned from the following description, phase may be associated with bits of a sliding window, namely a bit width of a sliding window. An oversampling rate may be associated with a nominal number of oversampled bits representing a real bit. Accordingly, an oversampling rate may be associated with an end point of a real bit in an oversampled input stream.

If, for example, phase indicates the starting bit, and the oversampling rate is five times the source frequency ("5×"), then there may be five oversampled bits in sequence, namely having a starting bit and an ending bit, which represent a real bit. For purposes of clarity by way of example and not limitation, an oversampling rate of 5×, namely an oversampling factor of 5, shall be assumed. However, it shall be appreciated that any of a variety of other oversampling rates may be used.

A sampling point lies somewhere between the starting and ending point of oversampled bits representing a real bit. A midpoint between the starting and ending points may be used as a sampling point of a bit width. Using a midpoint may promote robust recovery as it is a point furthest away from bit transitions, namely furthest away from starting and ending points within a bit width. Thus, odd oversampling factors may be more suitable, as there is a precise midpoint bit, or "midbit," that may be used as a sampling point. However, even oversampling rates may be used, but may have less robust performance. Furthermore, more bits than just the mid-bit may be sampled, for reasons described below in additional detail.

Returning to the example of a 20-bit input bus word 210, this input bus word 210 may be separated into a number of phases based on the oversampling rate. Continuing the above example of an oversampling rate of 5×, means that there are five phases. Furthermore, an oversampling factor of five means that there are five bits for each portion, or sub-score region, of a 20-bit window. Thus, for a given phase for this embodiment, there are four sub-scores per 20-bit window. The 20-bit window is a window used to evaluate the input stream. The phases are relative locations of the input window with respect to the input stream.

Accordingly, continuing the above example for an oversampling factor of five and an input bus word width of 20 bits, there are four sub-scores (e.g., 20/5) for each phase, and there are five phases. Determine and accumulate sub-scores block 201 determines the sub-scores for each of the phases and then accumulates the sub-scores for each of the phases to produce a total score 211 for each phase. Continuing the above example, there will be P total scores 211, namely one total score for each phase. In the above example there would be five phases and thus five total scores for the phases.

A total score 211 for each of the phases is provided to detection and tracking block 204. Detection and tracking block 204 may be configured to lock onto a phase based on a criterion. Furthermore, detection and tracking block 204 locks onto a phase to provide a selected phase 212 to sampler 205. Detection and tracking block 204 may lock onto a phase and may track each of the phases to determine whether to transition to a different phase for output. Changing to output a different selected phase 212 may be performed based on the criterion. For example, if the criterion for lock was a phase with a highest total score, detection and tracking block 204 would detect which of the total scores 211 was the highest, lock on to that highest score, and track that highest score to determine if it stayed the highest. Of note, it should be appreciated that tracking simply based on a highest total score for a phase may be an oversimplification, and any of a variety of criteria for selecting a phase and tracking a phase, which may be application-dependent, may be used.

Delay block 202 outputs input bus word 210, though a delayed version thereof, to sampler 205 such that it is synchronous with selected phase 212. In other words, the selected phase 212 being provided to sampler 205 is determined from the same input bus word 210 provided to sampler 205 from delay block 202 for this synchronous data operation.

Responsive to selected phase 212, sampler 205 selects Q bits for output as output data 213, for Q an integer greater than 0. In other words, Q is an integer in the range [N−1, N+1], where N is 20/5 for word width 20 and oversampling factor 5. Continuing the above example for an input bus word 210 of 20 bits and an oversampling rate of 5×, input bus word 210 contains four real bits whose phase or bit boundary may lie in any one of five locations. Input bus word 210 is sampled by sampler 205 responsive to a selected phase 212 for outputting the real bits as output data 213.

Even though for most operations of sampler 205, output data 213 for the above example will be four bits wide, there are two exceptions due to wraparound conditions, which are described below in additional detail. For these two exceptions, output data 213 may be either three or five bits in the above example. Accordingly, sampler 205 may be configured to provide a valid signal 214 of S bits wide, where S is of sufficient data width to indicate size of output data 213. Continuing the above example, for Q capable of being equal to three, four, or five real bits, valid signal 214 may output values of zero, one, and two respectively corresponding to the three, four, or five bits output via output data 213.

Figure 3:
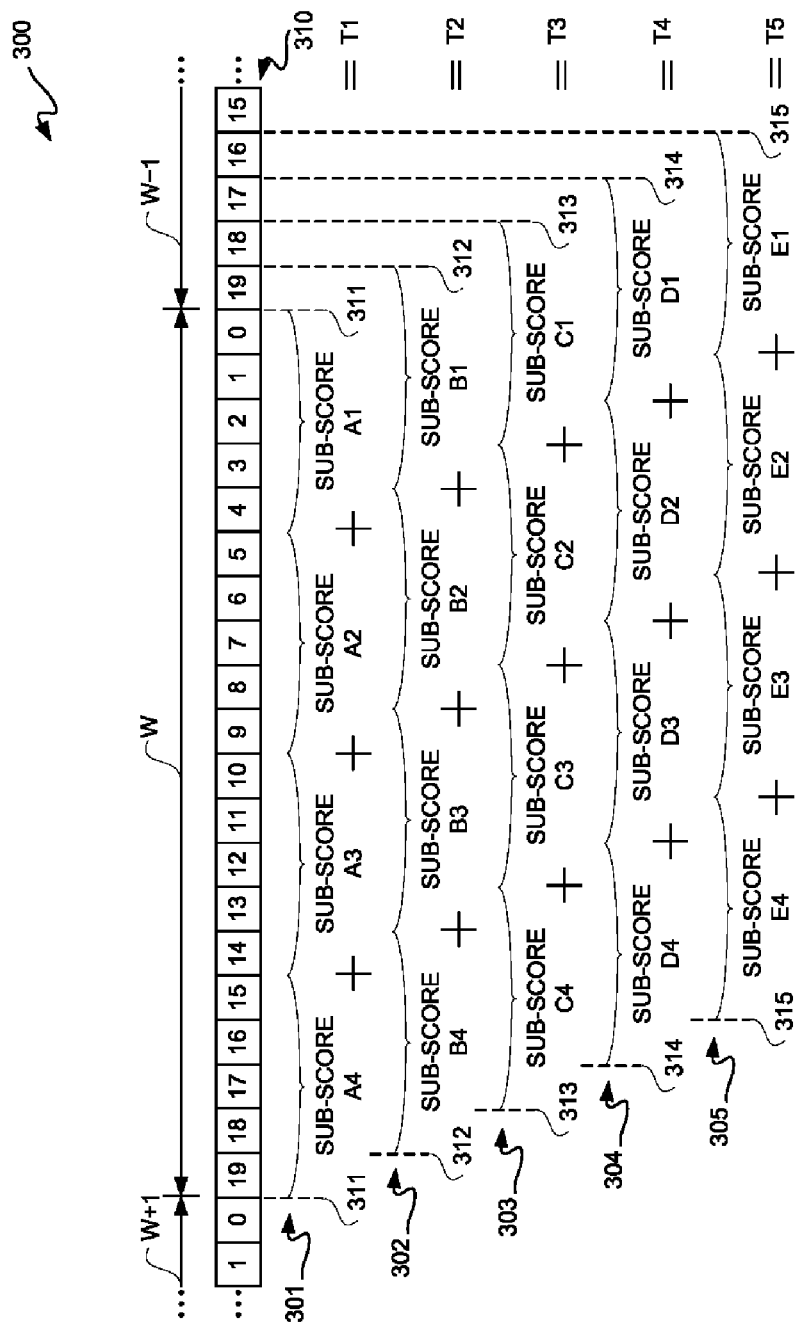
FIG. 3 is a data flow diagram depicting an exemplary embodiment of sub-score determination and accumulation data flow.

FIG. 3 is a data flow diagram depicting an exemplary embodiment of sub-score determination and accumulation data flow 300. With continuing reference to FIG. 3 and additional reference to FIG. 2, data flow 300 is further described.

Sub-score determination and accumulation data flow 300, which generally indicates functioning of determine and accumulate sub-scores block 201, is provided for purposes of clarity by way of example and not limitation in continuation of the above example of a 20-bit wide input bus word 210 and an oversampling rate of 5×.

Input bus words 210 are resolved from an input data stream 310. Each of these input bus words 210 is 20 bits wide as indicated by blocks 0 through 19 for each word, illustratively shown in FIG. 3 as words W−1, W, and W+1. Data input stream 310 is processed as illustratively shown from right to left such that a word W−1 precedes word W, and word W+1 follows word W.

Continuing the above example, there are five phases, generally indicated as phases 301 through 305. Each phase 301 through 305 is associated with a respective window having the bit width of a word W, as generally indicated by dashed lines as windows 311 through 315. Within each window, there are 20 bits divided into four successive sub-score regions or sections in the example of an oversampling factor of five.

Each of these four sub-score sections are indicated for each of the phases 301 through 305. Thus, for phases A through E corresponding respectively to phases 301 through 305: phase 301 has sub-score sections A1 through A4; phase 302 has sub-scores sections B1 through B4; phase 303 has sub-score sections C1 through C4; phase 304 has sub-score sections D1 through D4; and phase 305 has sub-score sections E1 through E4.

Each sub-score section for this example spans five bits. Thus, sub-score section A1 spans bits zero through four of word W. Sub-score section A2 spans bits five through nine of word W. Sub-score section A3 spans bits ten through fourteen of word W, and sub-score section A4 spans bits fifteen through nineteen of word W.

It should be understood that a phase is selected for locking onto a portion of data input stream 310 in order to accurately resolve where data transitions are actually occurring. Phases 302 through 305 are shifted to be in advance of phase 301. For example, phase 302 is one immediately preceding bit in advance of phase 301; phase 303 is one immediately preceding bit in advance of phase 302; and so on. This is referred to as sequential successive bit shifts in advance of a reference sliding window and is used to provide additional sliding windows, which are shifted with respect to one another as well as the reference sliding window.

Accordingly, each of phases 302 through 305 overlaps not only word W, but also word W−1. Thus, phase 302 starts at bit nineteen of word W−1 and ends at bit eighteen of word W, where each of sub-score sections B1 through B4 respectively span five successive bits, with an initial sub-score section B1 starting from bit nineteen of word W−1. The sub-score sections are successive, namely in this example sub-score sections B1 through B4 are successive groups of five without overlap. Likewise, phase 303 starts at bit eighteen of word W−1 and ends at bit seventeen of word W, with sub-score sections C1 through C4. Phase 304 starts at bit seventeen of word W−1 and ends at bit sixteen of word W and has sub-score sections D1 through D4. Lastly, phase 305 starts at bit sixteen of word W−1 and ends at bits fifteen of word W and has sub-score sections E1 through E4.

Thus, each sub-score for each sub-score section may be determined by determine and accumulate sub-scores block 201. After determining sub-scores for each phase 301 through 305, such sub-scores for each of the sub-score sections may be summed to provided a total phase score for each of the phases as generally indicated by plus ("+") and equal ("=") signs in FIG. 3. Thus, for example sub-scores A4 through A1 may be summed to provide a total score T1. Likewise, each of sub-scores B1 through B4, C1 through C4, D1 through D4, and E1 through E4 may be respectively summed to provide totals T2 through T5, respectively.

Because phases 302 through 305 span more than one word, it should be appreciated that delay block 202 and determine and accumulate sub-scores block 201 are configured to accommodate bits from a prior word, which in this example is up to four additional bits from a prior word with respect to phases 302 through 305.

It should be appreciated that in a substantially noisy environment there may not be significant discrimination between phases 301 through 305 if detection and tracking block 204 where simply to use a maximum phase score of total scores 211. In such a noisy communication environment, there may be local maxima or local minima, or both, which may preclude such a simple approach for outputting selected phase 212. Thus, more sophisticated selection criteria may be used depending upon the application.

Because delay block 202 may output bits from more than one input bus word 210, multiplexer circuitry (not shown) may be coupled on an output side of delay block 202 for selecting which 20 bits to output to sampler 205. Sampled output data 213 from sampler 205 may be one bit obtained from each sub-score section of a selected phase 212 of phases 301 through 305.

For the example, the nominal bit width of output data 213 is four bits. However, for the example the maximum bit width possibly output by sampler 205 for output data 213 is five bits. Accordingly, for this example the maximum bit width of five bits is accommodated, namely Q is equal to 5. To indicate whether three, four, or five bits are active or real as part of output data 213, a valid 214 indicates whether three, four, or five bits are active on output data 213. Accordingly, for this example S is equal to two, as zero, one, or two may be used to correspond to three, four, or five, respectively.

Figure 4:
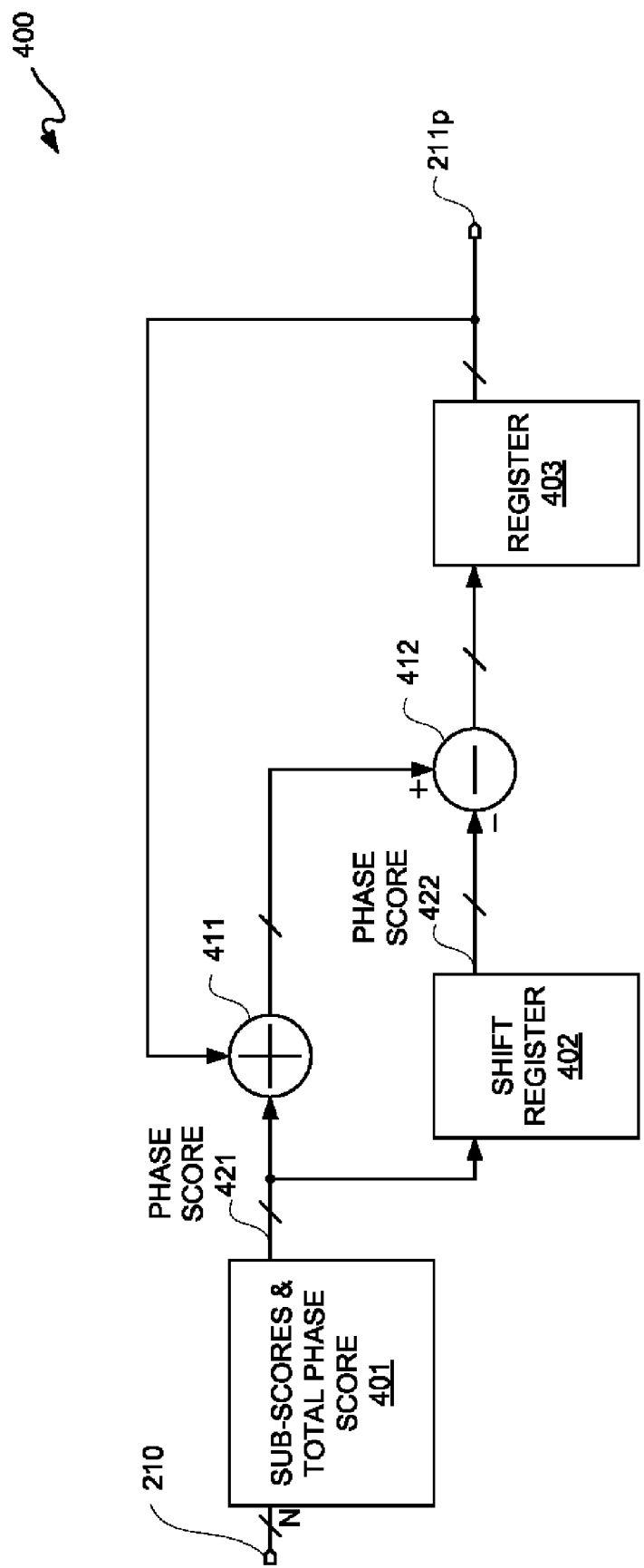
FIG. 4 is a block diagram depicting an exemplary embodiment of a moving accumulation block.

FIG. 4 is a block diagram depicting an exemplary embodiment of a moving accumulation block 400. With reference to FIGS. 2 and 4, moving accumulation block 400 is further described.

Moving accumulation block 400 may be part of determine and accumulate sub-scores block 201. For example, there may be one moving accumulation block 400 for each phase.

An input bus word 210 is provided to a sub-score block 401. Sub-score block 401 is configured to determine sub-scores and accumulate such sub-scores to provide a total phase score as previously described. Sub-score block 401 outputs a phase score 421 for a then current input bus word 210 being processed. Phase score 421 is stored in a shift register 402.

Shift register 402 has a depth which may be scaled in association with length of the sliding window. For purposes of clarity by way of example and not limitation and in continuation of the above example of a 20 bit wide input bus word, it shall be assumed that shift register 402 has a depth of 15 clock cycle stages such that 15 phase scores 421 may be stored in shift register 402 and sequentially clocked out thereafter. In other words, shift register 402 acts as a first in, first out buffer. Clock signaling is not illustratively shown for purposes of clarity and not limitation, but it should be appreciated that shift register 402 may be clocked responsive to an oversampling clock or a divided version thereof ("parallel oversampling clock") as previously described.

Phase score 421 is further provided to adder 411. An oldest phase score 422 stored in shift register 402 is shifted out, which at the initiation of moving accumulation block 400 may take 15 clock cycles in this embodiment. Phase score 422 is provided as an input to subtractor 412. Output of subtractor 412 is provided as an input to register stage 403. Register stage 403 may be clock responsive to a recovered clock as is shift register 402. Output of register stage 403 is the total accumulated ("running") phase score over the sampling window, in this example 16 phase scores, for a phase associated with total phase score block 401, namely phase score 211p. For example, the following Table illustrates operation of register stage 403.

TABLE

| (421) | (411) | Register (403) Output (211p) | (412) | Shift Register (402) | = | Register (403) Input |
|---|---|---|---|---|---|---|
| S5 | + | S4 + S3 + S2 + S1 | − | S1 | = | S5 + S4 + S3 + S2 |
| S6 | + | S5 + S4 + S3 + S2 | − | S2 | = | S6 + S5 + S4 + S3 |
| S7 | + | S6 + S5 + S4 + S3 | − | S3 | = | S7 + S6 + S5 + S4 |

TABLE-continued

| (421) | (411) | Register (403) Output (211p) | (412) | Shift Register (402) | = | Register (403) Input |
|---|---|---|---|---|---|---|
| S8 | + | S7 + S6 + S5 + S4 | – | S4 | = | S8 + S7 + S6 + S5 |
| S9 | + | S8 + S7 + S6 + S5 | – | S5 | = | S9 + S8 + S7 + S6 |

Output of register stage 403 is fed back and provided to as an input to adder 411. Accordingly, register stage 403 registers the total accumulated phase score and then outputs that total accumulated phase score as the current phase score to be used by detection and tracking block 204.

Output from adder 411 is provided as an input to subtractor 412. Phase score 422 is subtracted from the combined phase score of phase scores 421 and 211*p* to provide an input to register 403. By subtracting out a phase score, the overall phase score depth of moving accumulator block 400 may be maintained at 16 phase scores. Thus, the accumulation may be contained. Furthermore, it should be appreciated that by using a moving accumulation, along the lines of a moving average, the number of adders required to generate phase score 211*p* is reduced or minimized.

Figure 5:
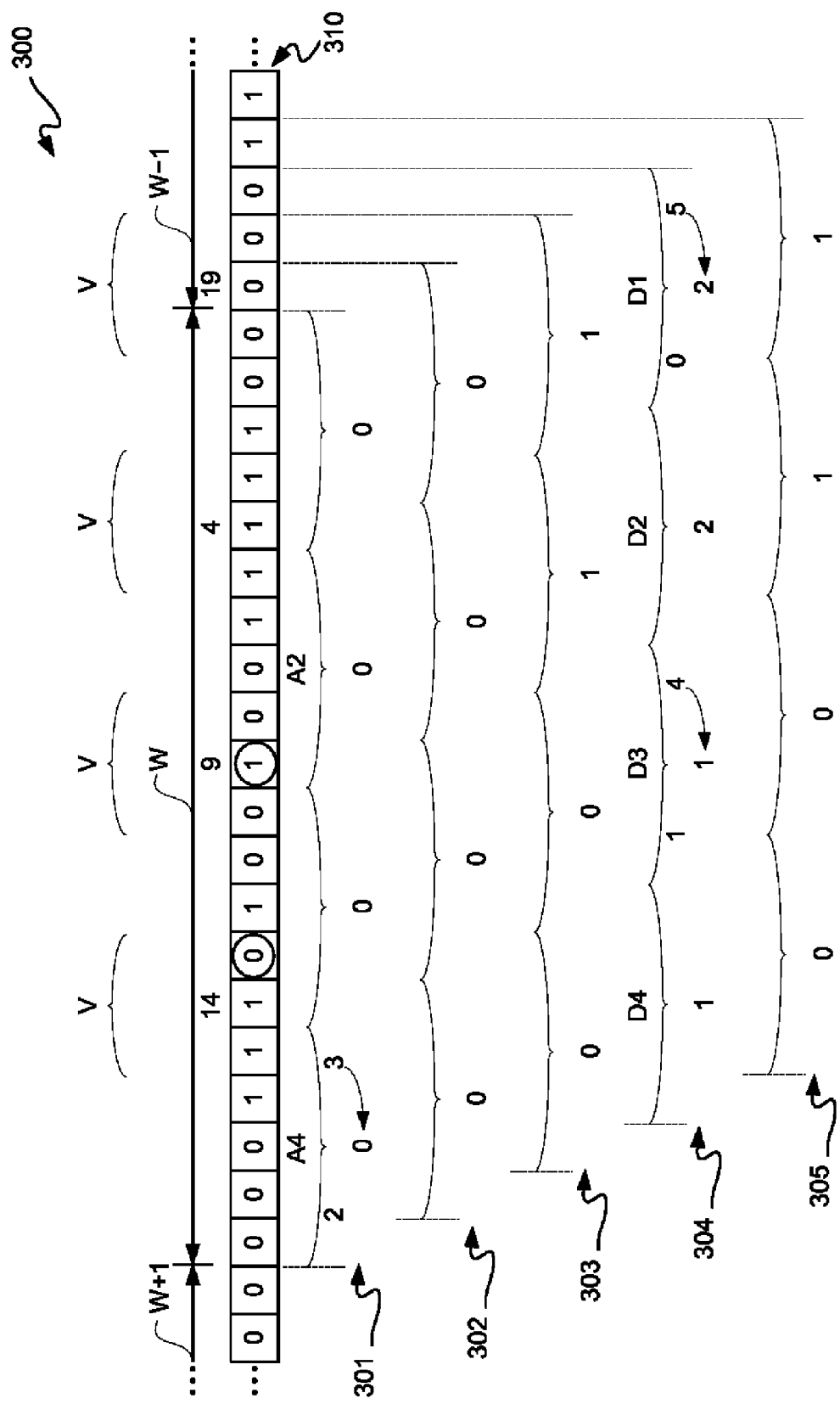
FIG. 5 depicts a numerical example of the data flow diagram of FIG. 3.

Turning to FIG. 5, there is shown a numerical example 500 of data flow 300 of FIG. 3. A cost function is used to determine a sub-score for each 5-bit sample of a 20 bit width, namely four five bit samples of a window which has a length of a word. Thus, a sub-score is determined for each five bit portion of a sample window and sub-scores are determined for all portions of a sample window. In this example there are four five bit portions and a sub-score is determined for each.

A Hamming Distance ("HD") is used for the cost function employed in this example. A HD defines a number of bits that differ between two equal length bit vectors. For example, the HD between "10110" and "00000" is three, namely three logic 1s separate the two vectors. The cost function used to determine sub-scores in the example of FIG. 5 is the maximum of the HD between all logic 0s and all logic 1s, namely:

$$[\text{Max HD}(x,0), \text{HD}(x,1)] \quad (1)$$

In Equation (1), x indicates the phase bits, and HD(x,0) is the HD between phase bits and all logic 0s. Accordingly, HD(x,1) is the HD between phase bits and all logic 1s. This formula may be used to produce a score of three, four, or five in the above example where there are at most five bits per phase sample. However, to reduce logic resources this score of three, four, or five is respectively mapped to 0, 1, or 2, as fewer logic resources may be used to represent the smaller bit values and as previously described.

Thus, the maximum HD as between HD(x,0) and HD(x,1) is selected as the sub-score to use, namely the one with the lowest homogeneity with reference either to all logic 0s or all logic 1s. In the example of FIG. 5, with reference to sub-score A4 equal to zero, the HD(x,0) value is 2. In other words, the difference between five logic 0s and the five bits (00011) associated with sub-score A4 is two logic 1s or 2. The HD between all logic 1s and the five bits associated with sub-score A4 is three logic 1s or 3. As between the values of 2 and 3, the larger value, namely 3, is selected as it is the maximum value as between the two HDs. The larger HD is selected and mapped to a corresponding value. In this example, three is mapped to zero, as illustratively shown by an arrow.

Continuing the example, the five bits associated with sub-score D3 are 00100. Accordingly, the HD with respect to all logic 0s is 1 and the HD with respect to all logic 1s is 4. Hence, the HD with respect to all logic 1s is selected, namely the value of 4. The HD of 4 is mapped to the value of 1, as illustratively shown by an arrow.

Lastly, for purposes of clarity by way of example and not limitation, the five bits associated with sub-score D1 are all zeros. Accordingly, the HD with respect to all logic 0s is 0, and the HD with respect to all logic 1s is 5. Accordingly, the larger HD as between these two is selected, namely 5, and that HD of 5 is mapped to the value of 2 as illustratively shown by an arrow.

Alternatively, rather than taking the maximum value as between two HDs, a minimum value may be used. This may be used to omit a mapping stage. Detection and tracking block 204 may thus be configured to select a minimum phase score.

Even though all the above examples involve selecting the five bits that were furthest from all logic 0s, it should be appreciated that the HD furthest from all logic 1s, such as for example with respect to sub-score A2, may be selected. It should be appreciated that a sub-score of 0, after mapping, indicates less homogeneity among the five bits and a sub-score of 2, after mapping, indicates the greatest homogeneity among the five bits. Lastly, a sub-score of 1, after mapping, indicates a degree of homogeneity in the middle of the other two examples. Additionally, even though an odd number of bits are illustratively shown, it should be appreciated that equal numbers of sample bits may be used.

Sub-scores A1 through A4 are totaled to provide a total phase score for phase A, namely T1. T1 in this example is 0. T2 through T5 for this example respectively are 0, 2, 6, and 2. If the criterion for selection was to select the maximum phase score, then detection and tracking block 204 may output phase 304, namely phase D, as selected phase 212.

If phase D were selected, then for a sampling point being a middle bit of each of the four portions of five bits each of phase D, bit nineteen of word W−1, and bits four, nine, and fourteen of word W would be selected by sampler 205 to provide output data 213. In the example of FIG. 5, the values of such bits would be respectively "0111." Note that a glitch has been sampled in this example at bit 9.

However, if selected phase 212 was for example phase 305, namely phase E, and then later selected phase 212 transitioned from phase E to phase 301, namely phase A, then a wraparound condition would exist. Moreover, if phase A was the selected phase 212 and the next phase selected for selected phase 212 was phase E, then a wraparound condition would exist. For purposes of clarity by way of example and not limitation, these two wraparound conditions are referred to as forward wrapping, namely going from phase E to phase A, and reverse wrapping, namely going from phase A to phase E.

The middle bit of each sub-score section of a selected phase may be selected for output by sampler 205. For four bits output by sampler 205, valid signal 214 would indicate that there are four valid bits in output data 213.

If there were no glitches, namely no erroneous logic values in data stream 310, then the selected phase should have a total score which is a maximum possible score. In this example, the maximum possible total score for a phase is eight. However, phase D has a total score of six, namely two less than a maximum possible score. Accordingly, there are glitches in bit stream 310.

In this example these glitches appear at bits nine and thirteen of word W as indicated by circles around those bit values. For a correctly selected phase in this example, there should be either five logic 0s or five logic 1s respectively for each real logic 0 and logic 1 bit. However, noise may cause one or more of these oversampled bits to be in an erroneous state.

The greater the difference, or discrimination, between phase scores, the higher the confidence level that a correct phase may be selected. In the example of FIG. 5, the discrimination between phase scores is relatively small as the smallest difference is only four as between the highest and the second highest scores. However, these total phase scores are the result evaluating one word W and a portion of word W−1, namely a one word window for bit sampling.

Discrimination may be improved between phase scores by using a larger number of input bus words in a sliding window. To enhance the integration of data, a larger window size, such as larger than one word, may be used to enhance reliability of output data 213. Thus, each phase score may be accumulated over a window containing a number of input bus words rather than just one input bus word. The size of the window may be selected such that at least two edges, namely two real bit transitions, occur within the window. Stated another way, it should be appreciated that in order to select a phase, data transitions are to occur within a window, and accordingly window size should be sufficiently large such as to capture at least two data transitions, namely from a logic 0 to a logic 1 or from a logic 1 to a logic 0.

The minimum window size for an application depends on the type of data being transmitted, for example a pseudo-random bit sequence ("PRBS") may be used. For example, if a maximum run length is 32 bits and the oversampling rate is 5×, for an input data word width of 20 bits, a minimum window size may be set equal to 16 words (e.g., 32×5×2/20). In this example, had the maximum run length been equal to 31 bits, the result would be 15.5 words, and thus the window size may be set to 16 words. It should be appreciated that other window sizes may be used.

The larger the value of the window size the greater the discrimination between phase scores. With respect to implementation in an FPGA using programmable logic, it should be appreciated that the window size may be a parameter which may be input by a user in order to have the implementation adapted to the application, and such adaptation may be done in the field.

Returning to FIG. 2, to recapitulate, the accumulated phase score or total phase score available for each of the phases may be used by detection and tracking block 204 to determine whether to keep or change the selected phase 212 output. The oversampled input bus word 210 may be delayed by delay block 202 to align it with selected phase 212. Real bits may be extracted from the delayed oversampled input bus word 210 output by sampler block 205.

As part of determining what bit value to output for each sub-score section as output data 213, a majority voting mechanism for example may be used by sampler 205. Majority voting returns a logic 1 if there are more logic 1s than logic 0s in a voting window and returns a logic 0 if there are more logic 0s than logic 1s in a voting window. The width of the voting window, namely the number of oversampled bits used in each sub-score section, may be a parameter which is set by a user.

Some FPGAs, such as the Virtex FGPA, can be programmed to incorporate blocks with pre-designed functionalities, i.e., "cores". A core can include a predetermined set of configuration bits that program the FPGA to perform one or more functions. Alternatively, a core can include source code or schematics that describe the logic and connectivity of a design. Typical cores can provide, but are not limited to, digital signal processing (DSP) functions, memories, storage elements, and math functions. Some cores include an optimally floorplanned layout targeted to a specific family of FPGAs. Cores can also be parameterizable, i.e., allowing the user to enter parameters to activate or change certain core functionality.

Furthermore, with respect to an FPGA core implementation, such a voting window parameter may be set in the field for instantiation of digital data recovery circuit 200 in programmable logic. The voting window may be set to an odd value, such as one, three, five, or some other odd integer. As previously described, the selected bit value for the bit to be output as a real bit for a sub-score section may be centered around a midpoint of the bits of the voting window. Thus as previously described, it was assumed that the voting window was set equal to one, and consequently the midpoint bit was selected as the real bit for output by sampler 205 for providing output data 213.

Majority voting may be implemented in sampler 205 using memory for storing read-only data whose address width depends on the width of the voting window. Thus for example returning to FIG. 5, if voting window V was set equal to three bits and phase D was selected, then rather than outputting a logic 1 as previously described for bit position nine of word W, bit positions eight, nine, and ten would be used to determine which value, either logic 1 or logic 0, had the majority. In this example, there would be two logic 0s and one logic 1 for bit positions eight through ten of word W. Accordingly, a logic 0 using a majority voting mechanism would be output instead of the bit value at bit position nine, which is a logic 1. As previously indicated, bit position nine is a glitch, and hence is erroneously a logic 1. The data stored at address "010" of such memory having read-only data in this example would contain the logic value 0. Thus it should be appreciated that using a majority voting window which is set to a value which is greater than one enhances accuracy in output data 213. Alternatively, it is possible to have an even value for a voting window, but it may be more problematic than using an odd value for a voting window.

A receiver clock conventionally may not be exactly frequency and phase aligned to that of a transmitter, which may promote phase drift over time and hence phase drift of a selected phase 212 over time. If a receive clock is faster than a transmit clock, a real bit may be represented by an extra oversampled bit at some point in time. For example, for 5× oversampling, a real bit may be represented at some point with six oversampled bits rather than five oversampled bits. Accordingly, digital data recovery circuit 200 may switch to track to a new phase, namely change selected phase 212, as a result of this extra oversampled bit. Furthermore, digital data recovery circuit 200 may output one less real bit than under normal operating conditions, namely for the above example may output three bits instead of the nominal four bits.

Figure 6:
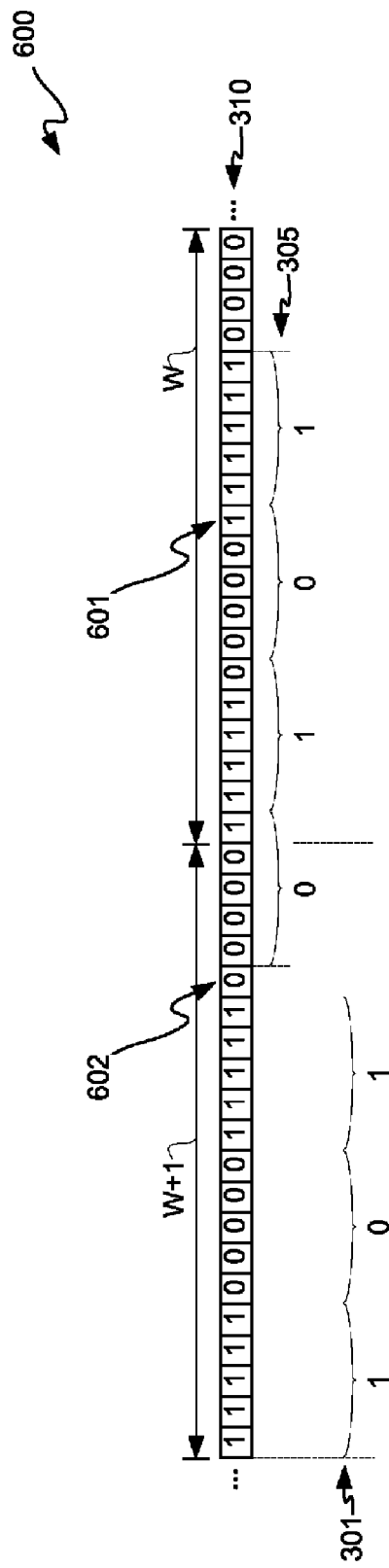
FIG. 6 is a data flow diagram depicting an exemplary embodiment of forward wrapping in a data flow.

FIG. 6 is a data flow diagram depicting an exemplary embodiment of forward wrapping in a data flow 600. In this example, it shall be assumed that the forward wrapping, continuing the above example, is a transition from phase 305 to phase 301, namely a transition from phase E to phase A. Responsive to a phase transition from phase E to phase A, there is an extra oversampled bit due to a receive clock being faster than a transmit clock. Thus in this example, the first real bit of word W+1 has already been sampled previously when it was the last real bit of word W for phase 305, namely phase E.

Word W is sampled using phase 305, namely phase E. With sampling using phase E, the first four bits of a word are not sampled, as they are sampled on the previous word, namely word W−1, when using phase E. As indicated by bit 601, there is a phase shift that results due to the receive clock being faster than the transmit clock. Responsive to such a phase shift, selected phase 212 may transition from using phase E to using phase A for sampling bits from word W+1.

For sampling word W using phase E, four real bits are output namely, bits "1010." However, word W+1 is sampled using phase 301, namely phase A. Phase A sampling normally would start sampling at bit position zero of word W. However, for a wraparound condition going from phase E to phase A, namely a forward wrapping, the first four bits of word W+1 have already been sampled when sampling word W using phase E. Accordingly, the first sub-score section of word W+1 is ignored for wrapping from phase E to phase A to avoid sampling the same bit twice.

For this embodiment, sampler 205 is configured such that a phase transition from phase E to phase A does not resample the first four bits of word W+1, where the fifth bit 602 of word W+1 is simply ignored. Thus, sampling of word W+1 begins at the sixth bit position, which sampling in this example outputs three real bits for word W+1, namely bits "101" for this example.

Figure 7:
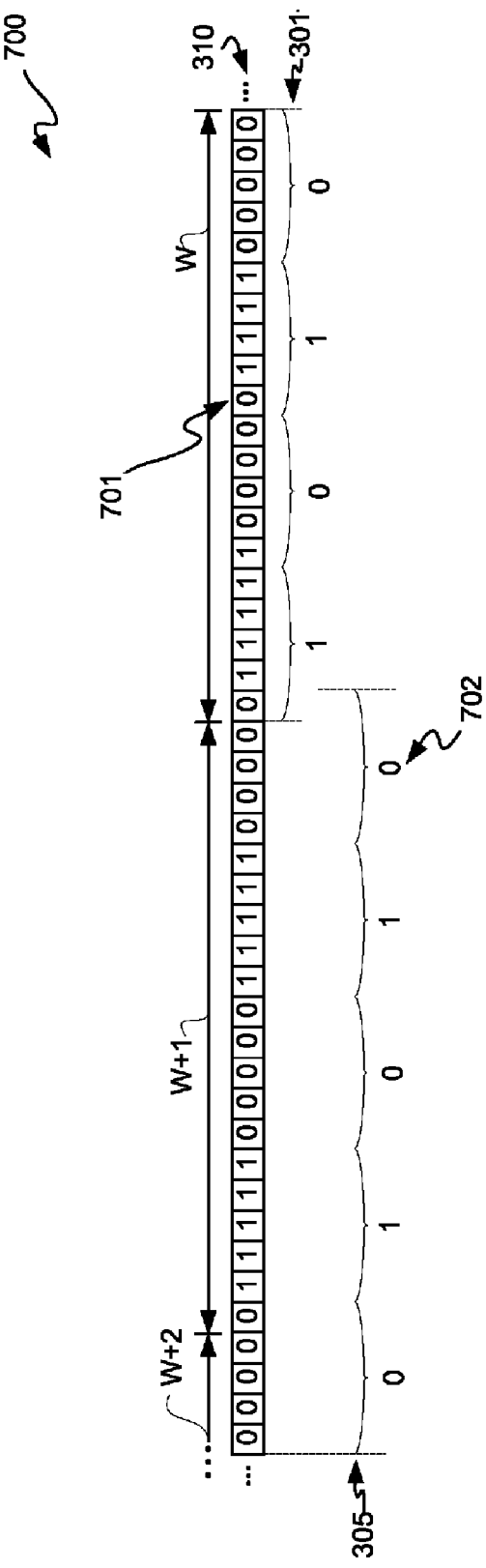
FIG. 7 is a data flow diagram depicting an exemplary embodiment of reverse wrapping in a data flow.

FIG. 7 is a data flow diagram depicting an exemplary embodiment of reverse wrapping in a data flow 700. Word W is sampled using phase A. As indicated by bit 701, a phase shift has resulted. However, this phase shift is due to the receive clock being slower than the transmit clock. Thus, a real bit will be represented by one less oversampled bit at some point in time. Thus, one additional bit, namely one more real bit, may be output than the nominal four bits.

So for sampling word W using phase A in this example, bits "0101," are output. Word W+1 is sampled using phase E. For a non-wrapping condition, phase E would start sampling word W+1 at the fifth bit position. However, if this were done for a reverse wrapping condition, the first four bits of word W+1 would not be sampled. Accordingly, sampler 205 is configured to sample the first four bits of word W+1 as well as the last bit of word W for an initial phase E sampling from a reverse wraparound. Thus, sampler 205 is configured to output an extra real bit 702 as part of the sampling of word W+1 for this initial sampling after a phase A to E transition. In this example, sampling of word W+1 with phase E would output bits "01010," namely five instead of the nominal four bits output, as output data 213.

To recapitulate with renewed reference to FIG. 2, sampler 205 either adds or removes a bit whenever a phase transition wraps across a phase boundary, namely from phase A to phase E or from phase E to phase A, respectively. Thus, valid signal 214 in this embodiment indicates whether three, four, or five bits are real bits with respect to output data 213 to account for a possible wrapping either in a forward or reverse direction. Thus, generally the bit width of output data 213 is equal to the input bus width divided by the oversampling factor plus or minus one bit.

If there are high levels of noise on bit stream 310, there may be less discrimination between phase scores. As the level of discrimination between phase scores decreases with increased noise, the highest phase score may be changing randomly. For example, phase B may have the highest score in one sampling iteration and in a next sampling iteration, phase E may have the highest score and in a next phase sampling iteration phase C may have the highest score. If the phase transitions from phase B to phase E, there are two possible directions for which the phase transition may occur, namely: going from phase B to phase E via phases C and D, where four real bits are output each time so there is no phase wraparound; or going from phase B to phase E via phase A, where there will be a five bit output due to a phase A to phase E wraparound.

To add stability to tracking of detection and tracking block 204, phase shifts may be limited to instances where discrimination between phase scores is greater than a minimum threshold. Such a minimum threshold may vary from application to application depending on the degree of sensitivity to noise, and thus may be user specified, such as in the field for an FPGA implementation. Additionally, phase may be allowed to transition only to an adjacent phase. For example, transitions from phase B may only be allowed to be to phase A or to phase C. Phase A may only be transitioned to phase E or to phase B. By adding one or more of these stability criteria to detection and tracking block 204, the likelihood of losing lock with an expected bit pattern is reduced.

Figure 8:
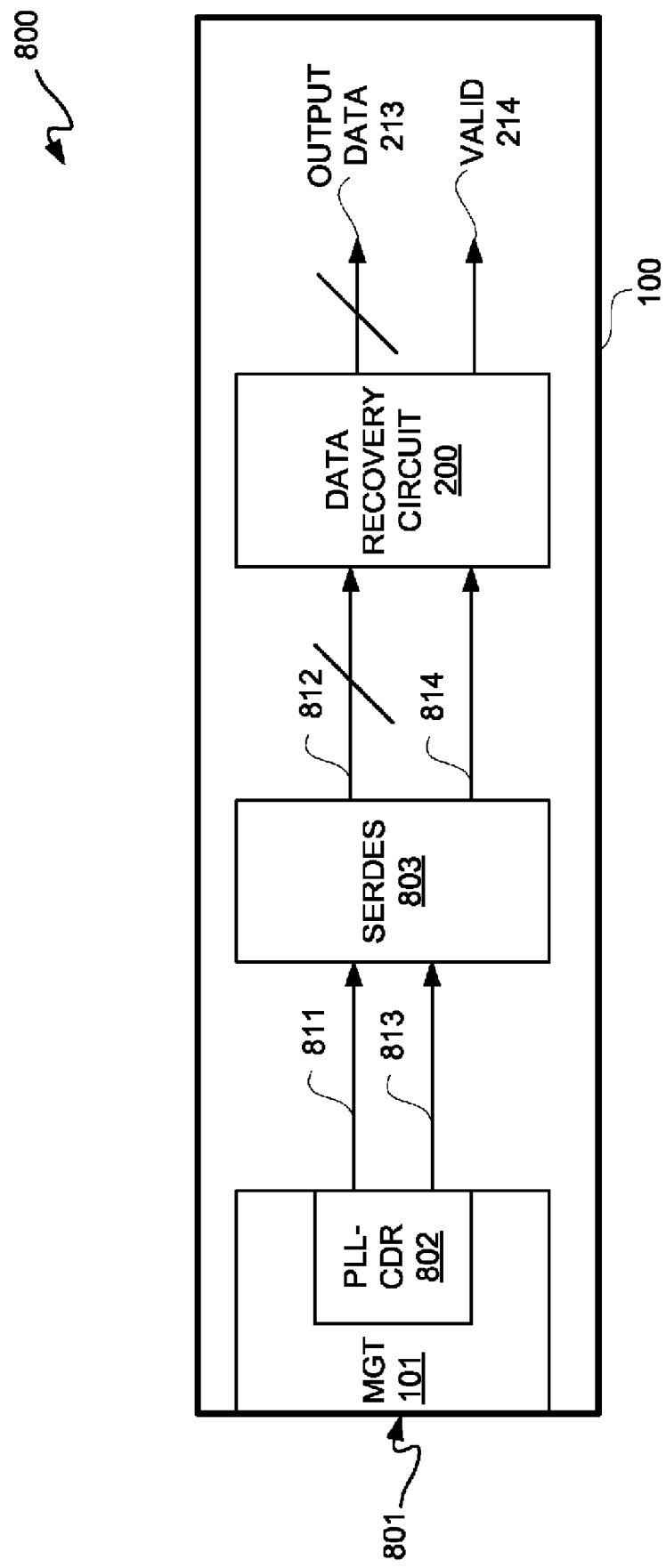
FIG. 8 is a block diagram depicting an exemplary embodiment of a System-on-Chip integrated circuit ("IC").

FIG. 8 is a block diagram depicting an exemplary embodiment of a System-on-Chip IC 800. IC 800 in this embodiment is FPGA 100; however, other ICs may be used.

IC 800 includes an MGT 101 having a PLL-based CDR circuit 802, a SERDES 803, and data recovery circuit 200. A serial transmission 801 is received by MGT 101 and is converted by PLL-based CDR circuit 802 into a recovered serial data stream 811 and a recovered clock 813. PLL-based CDR circuit 802 is designed to operate at a minimum frequency without overclocking a received transmission, and for serial transmission 801 below such minimum frequency, recovered serial data stream 811 is oversampled.

Recovered serial data stream 811 and parallel oversampling clock signal 813 are provided to SERDES 803. SERDES 803 produces a recovered parallel data stream 812 and a recovered clock signal 814. Frequency of recovered clock signal 814 is less than frequency of recovered clock signal 813 responsive to the serial to parallel conversion. Recovered parallel data stream 812 may include oversampled bits, and is provided as input word bus 210 to data recovery circuit 200 of FIG. 2.

Data recovery circuit 200 receives recovered parallel data stream 812 and recovered clock signal 814 and provides output data 213 and valid signal 214. Data recovery circuit 200, as well as SERDES 803, may be implemented in programmable logic of FPGA. More particularly, parameters for configuring data recovery circuit 200 may be ascribed in the field for user configuration for a data recovery circuit 200 provided as a core for instantiation in an FPGA.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A data recovery circuit, comprising:
an accumulator coupled to receive oversampled data;
the accumulator configured to determine and to accumulate sub-scores from the oversampled data using a sliding window;
a bit width of the sliding window being associated with data width of the oversampled data input to the accumulator;
the sliding window being sequentially and incrementally shifted to bitwise resolve phases from the oversampled data;
the phases in number being associated with an oversampling factor;
the accumulator further configured to sum the sub-scores for each of the phases to provide scores for each of the phases;
a detector-tracker circuit coupled to receive the scores;

the detector-tracker circuit configured to select a phase of the phases responsive at least to the scores and output the phase selected;

the detector-tracker circuit further configured to track the phase selected;

a delay circuit coupled to receive the oversampled data and configured to output a delayed version of the oversampled data;

a sampler coupled to receive the delayed version of the oversampled data and the phase selected; and the sampler configured to sample the oversampled data responsive to the phase selected to provided sampled data for output as a subset of the oversampled data.

2. The data recovery circuit according to claim 1, wherein:
the sampler is further configured to output valid bits indicating size of the sampled data output; and
the size of the sampled data output varies from a nominal value responsive to phase wraparound.

3. The data recovery circuit according to claim 1, wherein the sub-scores are determined by using a cost function.

4. The data recovery circuit according to claim 3, wherein the cost function uses Hamming distances.

5. The data recovery circuit according to claim 1, wherein the sampler is configured to sample the oversampled data further responsive to a voting window to provided sampled data for output.

6. The data recovery circuit according to claim 1, wherein the accumulator is further configured to employ a moving accumulation to provide the scores for each of the phases.

7. A method for data recovery, comprising:
obtaining an input word stream, the input word stream having a word width of at least one word;
applying a sliding window to the input word stream to resolve phases;
determining scores for phases;
the scores generated at least in part by,
subdividing the sliding window into sample portions;
applying a homogeneity function to each of the sample portions to determine respective values therefore; and
summing sets of the values respectively associated with the phases to provide the scores;
selecting a score from the scores according to at least one criterion to select a first phase from the phases;
sampling a portion of a delayed version of the input word stream by application of a sampling window thereto using the first phase selected; and
outputting first sampled bits from the portion of the delayed version responsive to the sampling.

8. The method according to claim 7, further comprising:
limiting selection of the first phase from a previously selected second phase of the phases responsive to exceeding a threshold difference as between the score of the first phase in comparison to a score of the second phase; and
further limiting the selection of the first phase to being a neighbor of the second phase.

9. The method according to claim 7, further comprising:
the sampling window being associated with a first position of the sliding window as indicated by the first phase selected;
selecting a second phase from the phases prompting a wraparound condition;
sampling another portion of the delayed version of the input word stream by another application of the sampling window thereto using the second phase selected;
the sampling window being associated with a second position of the sliding window as indicated by the second phase selected, the second position being different from the first position;
outputting second sampled bits from the other portion of the delayed version of the input word stream; and
the second sampled bits being different in number than the first sampled bits responsive to the wraparound condition.

10. The method according to claim 7, wherein the sampling includes applying a voting window greater than one bit to each of the sample portions of the portion of the delayed version of the input word stream sampled using the first phase selected.

11. The method according to claim 7, wherein the homogeneity function uses Hamming Distances.

12. The method according to claim 11, wherein the homogeneity function includes:
determining first Hamming Distances for each of the sample portions;
the first Hamming Distances being from all logic zeros;
determining second Hamming Distances for each of the sample portions;
the second Hamming Distances being from all logic ones; and
selecting either a first Hamming Distance or a second Hamming Distance from the first Hamming Distances and the second Hamming Distances, respectively, for each of the sample portions to provide the sets of the values.

13. The method according to claim 12, wherein:
the first Hamming Distances and the second Hamming Distances are respectively mapped to associated indices to provide the sets of the values; and
the indices being numerically smaller than the first Hamming Distances and the second Hamming Distances.

14. A system-on-chip integrated circuit, comprising:
a transceiver;
the transceiver having a sampling circuit;
the sampling circuit configured to operate above a first bit rate;
a serial-to-parallel converter coupled to the clock data recovery circuit to receive a serial bitstream therefrom and to convert the serial bitstream into a parallel bitstream;
the serial bitstream capable of being associated with a second bit rate lower than the first bit rate;
a data recovery circuit coupled to receive the parallel bitstream;
the parallel bitstream capable of representing oversampled data responsive to the serial bitstream being at the second bit rate;
the data recovery circuit, including:
an accumulator coupled to receive the oversampled data;
the accumulator configured to determine and to accumulate sub-scores from the oversampled data using a sliding window;
a bit width of the sliding window being associated with data width of the oversampled data input to the accumulator;
the sliding window being sequentially and incrementally shifted to bitwise resolve phases from the oversampled data;
the phases in number being associated with an oversampling factor;

the accumulator further configured to sum the sub-scores for each of the phases to provide scores for each of the phases;
a detector-tracker circuit coupled to receive the scores;
the detector-tracker circuit configured to select a phase of the phases responsive at least to the scores and output the phase selected;
the detector-tracker circuit further configured to track the phase selected;
a delay circuit coupled to receive the oversampled data and configured to output a delayed version of the oversampled data;
a sampler coupled to receive the delayed version of the oversampled data and the phase selected; and
the sampler configured to sample the oversampled data responsive to the phase selected to provided sampled data for output as a subset of the oversampled data.

15. The system-on-chip integrated circuit according to claim 14, wherein:
the sampler is further configured to output valid bits indicating size of the sampled data output; and
the size of the sampled data output varies from a nominal value responsive to phase wraparound.

16. The system-on-chip integrated circuit according to claim 14, wherein the sub-scores are determined by using a cost function.

17. The system-on-chip integrated circuit according to claim 16, wherein the cost function uses Hamming Distances.

18. The system-on-chip integrated circuit according to claim 14, wherein the sampler is configured to sample the oversampled data further responsive to a voting window to provided sampled data for output.

19. The system-on-chip integrated circuit according to claim 14, wherein the accumulator is further configured to employ a moving accumulation to provide the scores for each of the phases.

20. The system-on-chip integrated circuit according to claim 14, wherein:
the system-on-chip integrated circuit is a programmable logic device; and
the data recovery circuit is capable of being in-field instantiated in programmable logic of the programmable logic device.

* * * * *